United States Patent

Russek, Jr.

[15] 3,704,606

[45] Dec. 5, 1972

[54] FILLER TUBE LOCKING DEVICE

[72] Inventor: Simon E. Russek, Jr., 17251 Mayerling Street, Los Angeles, Calif. 91344

[22] Filed: Nov. 27, 1970

[21] Appl. No.: 93,121

[52] U.S. Cl. ..........................70/164, 292/1, 296/1 C
[51] Int. Cl. .................................................B65d 55/14
[58] Field of Search........70/158, 159, 160, 161, 162, 70/163, 164, 165, 166, 167, 168, 169, 170, 171, 172, 173, DIG. 65; 292/1

[56] References Cited

UNITED STATES PATENTS 1,747,201  2/1930  White....................................70/164

FOREIGN PATENTS OR APPLICATIONS 940,103  12/1948  France.................................70/164
542,273  1/1942  Great Britain.......................70/164
1,006,532  4/1952  France.................................70/158

OTHER PUBLICATIONS

Popular Science (magazine), April 1956, Page 225

Popular Science Publishing Co., Inc., 355 Lexington Ave., N.Y., N.Y., 10017

Primary Examiner—Albert G. Craig, Jr.
Attorney—Lewis B. Sternfels

[57] ABSTRACT

For filler tubes for gasoline tanks and other receptacles located adjacent a motor vehicle door or other lockable closure, removal of a conventional cap, such as a gasoline cap, from the filler tube is prevented by means of a hinged strap. One end of the strap is affixed to the cap while the other end of the strap is adapted to be positioned in the recess between the lip of the door and body frame. When the strap is positioned in the recess and the door is closed, the hinge cannot be removed from the recess and, consequently, the cap cannot be rotated or otherwise removed from the gasoline filler tube. Locking of the door effectively locks the gas cap to the filler tube. One of several lips or latches may be provided on the vehicle frame to engage the strap to further hold the strap in position and to further maintain locking engagement between the cap and the filler tube. Alternately, the hinged strap may be positioned over the cap to perform the same purpose.

11 Claims, 8 Drawing Figures

PATENTED DEC 5 1972 3,704,606

INVENTOR
SIMON E. RUSSEK, JR.

ATTORNEY

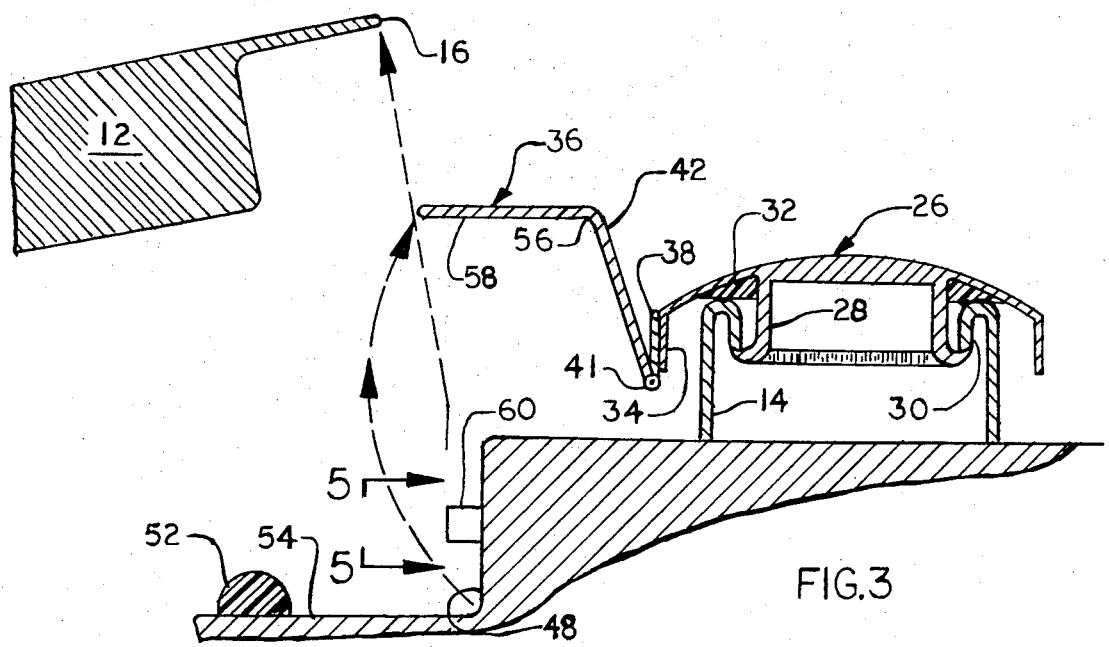
FIG.3
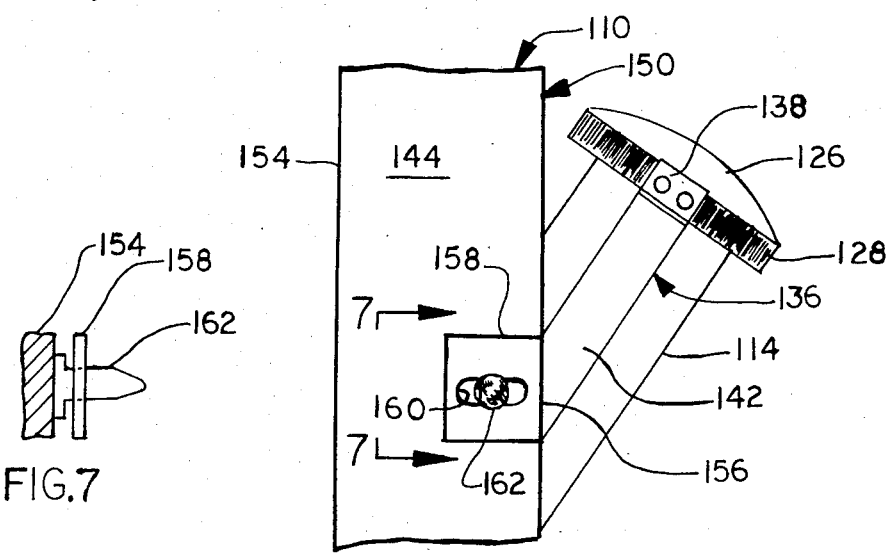
FIG.7
FIG.6

FILLER TUBE LOCKING DEVICE

The present invention relates to a means for preventing theft of gasoline from a tank or entry into a receptacle and, in particular, to a means for locking a cap to a filler tube for the tank or receptacle.

Vehicles at one time or another are left unattended in some parking area and, therefore, are liable to theft, such as pilferage of gasoline, or to vandalism, such as the placement of foreign material into such tanks or other receptacles; e.g., water tanks. The hazard of such pilferage or vandalism occurs most often when the vehicles are left in relatively unattended areas, as construction sites, campgrounds, outdoor areas, and even in garages or on the streets. This type of thievery requires little effort when the gasoline can be siphoned through the filler tube.

Conventional means for preventing such losses include gasoline caps having a key lock built therein. These locks work well; however, they have certain disadvantages. They are not sold as standard equipment, that is, they are sold independently of the motor vehicle and, therefore, require additional expenditures by the vehicle owner. A key, additional to the vehicle key, may be required and may be lost or become otherwise unavailable. For example, if the vehicle is loaned to a person other than the owner, the key may not be given to that person and, consequently, he would be unable to gain access to the gas tank. Furthermore, filler tubes come in different sizes, thereby requiring caps designed especially for the particular tube. Finally, should the lock become damaged or otherwise not function properly through use or exposure to the weather, removal of the locking gas cap by the key may be impossible and require damage to the vehicle.

The present invention overcomes these and other problems by avoiding the use of a specially designed filler tube cap and by utilization of the already furnished cap. Briefly, the present invention comprises a hinged fixture or strap in which one portion is attached to the standard gasoline cap such as by riveting, welding, and the like, and the other hinged part is adapted to fit within the recess provided between the door and door frame. When so fitted into the recess, and door is closed, the hinged strap cannot be removed therefrom and, consequently, prevents removal of the gas cap from the filler tube. Locking of the door in its conventional manner effectively locks the gas cap to the filler tube. Alternatively, the strap may be hinged to the vehicle body behind the filler tube or onto the filler tube itself and configured to extend over the gas cap and into the recess between the door or its lip and the door frame. This latter embodiment may not prevent turning of the gas cap with respect to the filler tube, but it does prevent removal of the gas cap outwardly from the filler tube.

It is, therefore, an object of the present invention to provide a gasoline theft preventive means for a motor vehicle.

Another object is the provision of a gasoline cap locking means.

Another object is to provide a locking device for conventional gasoline filler tube caps.

Another object is the provision of a locking means particularly adapted to gasoline filler tubes located adjacent motor vehicle doors or other lockable openings.

These and other objects, as well as a more complete understanding of the present invention, will become more apparent with reference to the illustrative embodiments of the present invention, wherein:

FIG. 3 is a view similar to FIG. 2 but showing the gasoline cap in unlocked position;

FIG. 6 is a second embodiment of the present invention showing a different form of latching means;

FIG. 7 is a view taken along line 7—7 of FIG. 6; and

Figure 1:
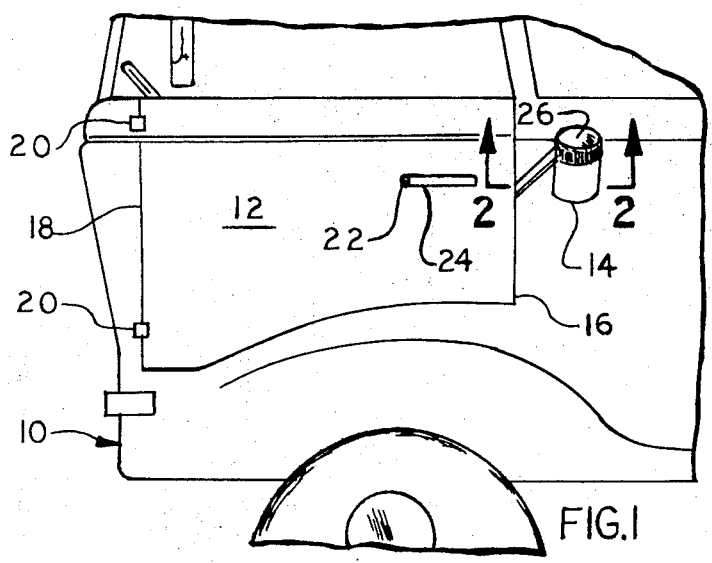
FIG. 1 is a view of a partial section of a motor vehicle illustrating a conventional gas cap in locking engagement with a filler tube by means of the present invention.
Figure 4:
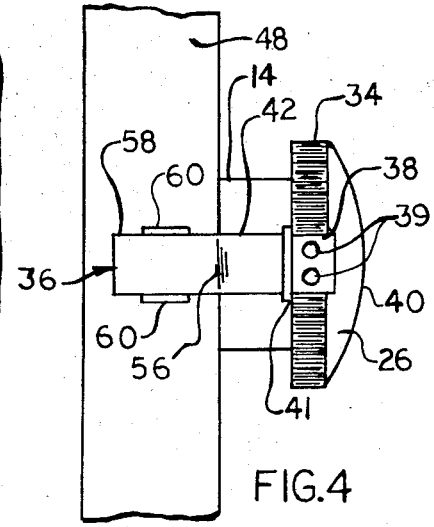
FIG. 4 is a view taken along lines 4—4 of FIG. 2.

Accordingly, with reference to FIGS. 1–5, a motor vehicle 10 is shown in section with a portion of a door 12 for closing the driver's compartment and a gasoline filler tube 14 positioned adjacent one edge 16 of the door. The other edge 18 of the door 12 is hinged to the vehicle by hinges 20 in a well-known manner. The door is disposed to be locked to the vehicle by means of a conventional lock 22 in a door handle 24 or in door 12.

Filler tube 14 is closed by means of a cap 26 of conventional construction. The cap closes and seals the filler tube by means of an inwardly projecting lip 28 which engages a filler tube lip 30. A conventional gasket 32 is provided to seal the filler tube. An annular lip 34 completes gasoline cap 26.

Attached to annular lip 34 is a hinge 36 having a first element or portion 38, which is secured to the annular lip 34 such as by rivets 39, welding, screws, or other suitable means. It is to be understood that portion 38 may also be affixed to outer surface 40 of cap 26. Pivotably secured to first element 38 is a second element or portion 42 which is so disposed as to fit within a space or recess 44 defined by a side portion 46 of door 12 and an internal frame member 48 of the vehicle. The recess is closed off by edge 16 of the door to provide a small space 50 between lip 16 and internal frame member 48. A conventional seal 52 is provided between door 12 and frame 54 of the vehicle.

Figure 5:
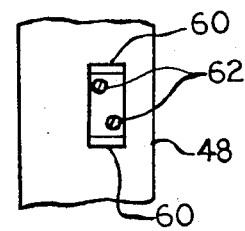
FIG. 5 is a view taken along lines 5—5 of FIG. 3.

To obtain locking of cap 26 with respect to filler tube 14, hinge element 42 is bent at 56 so as to provide a segment 58 approximately flat with internal frame member 48. Hinge segment 58 is adapted to be received by and between a pair of outwardly extending fingers 60 which are secured, as shown in FIG. 5, to internal frame member 48 by screws 62, welding, riveting, and the like.

Figure 2:
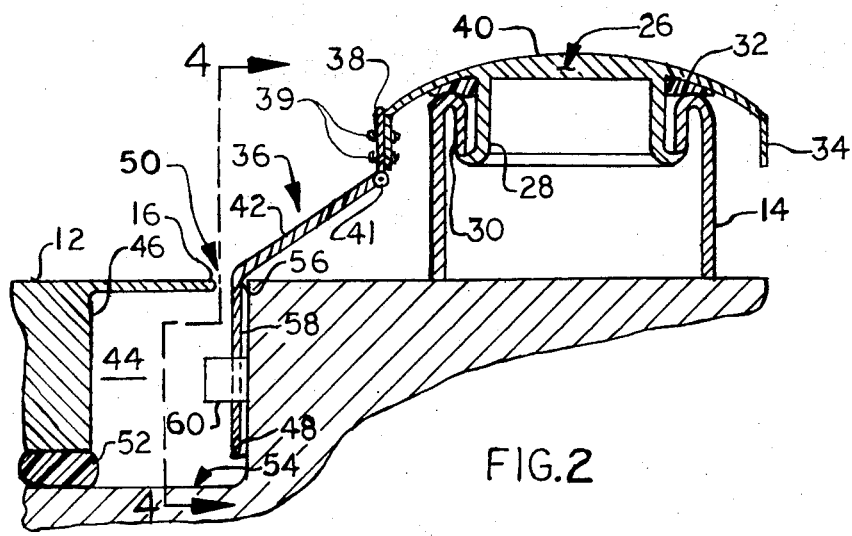
FIG. 2 is a sectional view taken along lines 2—2 of FIG. 1 showing the gasoline cap in locked position.

As shown in FIG. 2, when cap 26 engages filler tube 14, so that lips 28 and 30 engage, hinge 36 is so positioned that segment 58 is retained in and held between fingers 60. When door 12 is latched to frame 54 by conventional means, it is not possible for segment 58 and second element 42 to be removed from recess 44, thereby preventing turning of cap 26 with respect to tube 14. Consequently, the cap cannot be removed from the filler tube. When lock 22 of the door is locked, the door cannot be opened and, therefore, cap 26 is locked to tube 14.

As shown in FIG. 3, when the door is unlocked and pivoted about hinges 20, it is than possible to pivot element 42 about its pivot 41 so that cap 26 may be freely unsecured from filler tube 14 for purposes of filling the fuel tank.

Now referring to FIGS. 6 and 7, a filler tube 114 is shown extending from the body of a motor vehicle 110 and closed off by a gasoline cap 126. Secured to a lip 128 on cap 126 is a hinge 136 comprising a first element 138 and a second element 142. The second element is bent at 156, to accommodate the spacing of filler tube 114 from a door frame 154, and terminates in a segment 158. As an alternate to the above latching device, segment 158 is provided with a hole 160 for reception of a lug 162 which is secured to frame 154 in any convenient manner. Latching of this embodiment is similar to that described above and, in addition, has the further advantage of preventing accidental or intentional removal or slippage of hinge 136 from recess 144 through space 150 between the door lip and the frame.

Figure 8:
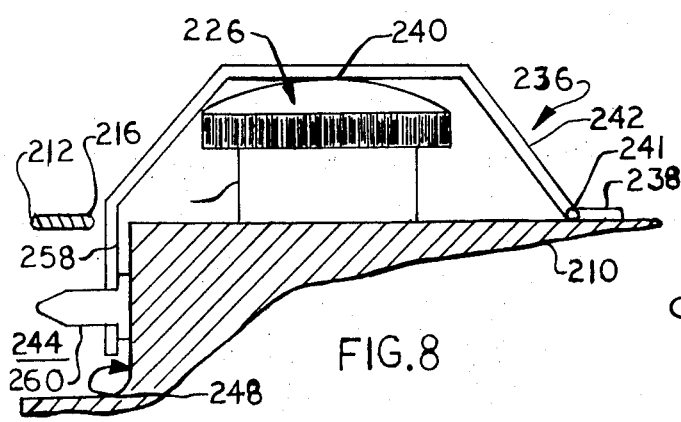
FIG. 8 is a view of a third embodiment of the present invention.

A third embodiment of the present invention is shown in FIG. 8 wherein a gas cap 226 is secured to a filler tube 214 in a conventional manner. A hinge 236, rather than being secured to the gas cap as previously depicted, is secured to the vehicle 210 by a first element 238. Secured to first element 238 is a second element 242 by means of a pivot 241. The second element 242 is so configured as to be bent around the top 240 of cap 226 so that its end segment 258 can extend within vehicle recess 244 for reception by pin or boss 260 on internal frame member 248. In this embodiment, when segment 258 is engaged on boss 260 and vehicle door 212 is latched to the vehicle frame, cap 226 can be turned or otherwise rotated with respect to filler tube 214, but cannot be removed therefrom because of the contact between second element 242 and the top of the cap. If desired, a groove may be provided on the cap top to prevent turning of the cap.

Although the invention has been described with reference to particular embodiments thereof, it should be realized that various changes and modifications may be made therein without departing from the spirit and scope of the invention.

What is claimed is:

1. A locking device for preventing removal of fuel from a tank in a motor vehicle comprising
a driver's compartment,
a door frame permitting entry to and egress from said compartment and having a pair of internal frame members defining the sides of said frame,
a door hinged to said frame at one of said frame members for closure of said door into said frame, said door having a side portion movable into juxtaposition with the other of said frame members when said door is closed into said frame, and providing recess means,
a latching mechanism coupled to said door and said frame for latching said door to said frame at said side portion and said other frame member, said mechanism including a locking arrangement for locking said door to said frame at said door side portion and said other frame member to seal said compartment,
a fixture affixed to said other frame member in said recess means and enclosable by said door when said door is latched to said frame,
a fuel tank secured to the motor vehicle,
a filler tube connected to said fuel tank and having an end extending to the exterior of the motor vehicle for permitting access to said fuel tank for filling thereof of the fuel, said filler tube end positioned adjacent to said other frame member and proximate to said fixture,
a cap engageable with said filler tube end for closure thereof,
a hinge having a first element, a second element and journal means connecting said first and second elements for pivoting of said first element with respect to said second element into two end positions, said hinge having a surface for cooperable engagement with said cap,
said first element having means engageable with said fixture in one of the pivot positions of said first element for preventing removal of said cap from said filler tube, and said door latchable and lockable to said frame respectively by said latching mechanism and said locking arrangement for enclosing the engagement between said first element and said fixture and for preventing disengagement therebetween, and
said first element pivotable away from said fixture when said door is not closed with respect to said frame to permit removal of said cap from said filler tube.

2. A locking device as in claim 1 wherein said hinge surface is positioned on said second element and further including means bonding said second element to said cap at said surface.

3. A locking device as in claim 1 wherein said hinge surface is positioned on said first element and said cap is positionable between said surface and said filler tube when said first element means is engaged with said fixture and including means bonding said second element to the motor vehicle.

4. In a motor vehicle having a door frame and a door closable in the frame and a receptacle filler tube closable by a filler tube cap positioned adjacent to the door frame, the improvement in filler tube locking devices comprising:
holding means on the door frame, a hinged clasp having a first portion affixed to the filler tube cap and a second portion, said second portion having a first segment hinged to said first portion and a second segment angled to said first segment in latching engagement with said holding means and maintained in the engagement with the door frame by the door when the door is closed in the frame so as to prevent removal of the cap from the filler tube when engaged therewith.

5. In a vehicle having a tank filler tube and cap therefor positioned adjacent a door and door frame, the improvement in filler tube cap locking devices comprising holding means secured to the door frame and a hinge coupled to the cap and engageable with said holding means in latching engagement therewith for preventing removal of the cap from the tube when said hinge is engaged with said holding means, the door maintaining the engagement between said holding means and said hinge.

6. In combination with a vehicle body having opening means therein, a closure for the opening means and engageable therewith, a fuel tank carried by the vehicle body with its inlet disposed adjacent the opening means and extending outside the vehicle body, and removeable closure means for the inlet and having an annular lip encircling the inlet, the improvement in locking devices for the inlet comprising locking means affixed to the annular lip of the inlet closure means and engageable with the opening means and the opening means closure when the closure is engaged with the opening means for preventing removal of the closure means from the inlet.

7. In combination with a vehicle body having opening means therein, a closure for the opening means and engageable therewith, a fuel tank carried by the vehicle body with its inlet disposed adjacent the opening means and extending outside the vehicle body, and removeable closure means for the inlet, the improvement in locking devices for the inlet comprising a clasp secured to the opening means and locking means associated with the inlet closure means and engageable and latchable with said clasp when the closure is engaged with the opening means for preventing removal of the closure means from the inlet.

8. The improvement as in claim 7 wherein said locking means comprises a hinge having a first portion affixed to the removeable closure means and a second portion journalled to said first portion and adapted for engagement with the opening means and the opening means closure.

9. The improvement as in claim 7 wherein said clasp comprises a pair of arms for receiving and frictionally holding said second portion.

10. The improvement as in claim 7 wherein said clasp comprises a lug for holding insertion within opening means in said second portion.

11. The improvement as in claim 7 wherein said locking means comprises a hinge having a first portion affixed to the vehicle body and a second portion journalled to said first portion and having a configuration permitting at least partial covering of the removeable closure means to prevent removal thereof from the inlet, said second portion adapted for engagement with the opening means and the opening means closure during the partial covering.

* * * * *